(12) United States Patent
Schwartz et al.

(10) Patent No.: US 7,790,030 B2
(45) Date of Patent: *Sep. 7, 2010

(54) MULTI-TUBE PRESSURE VESSEL

(75) Inventors: A. William Schwartz, Upland, CA (US); Mark E. Schott, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 470 days.

This patent is subject to a terminal disclaimer.

(21) Appl. No.: 11/642,446

(22) Filed: Dec. 20, 2006

(65) Prior Publication Data

US 2008/0149555 A1    Jun. 26, 2008

(51) Int. Cl.
*B01D 24/00* (2006.01)
(52) U.S. Cl. .............................. 210/323.1; 210/321.81; 210/321.8; 210/455
(58) Field of Classification Search ............ 210/321.83, 210/330, 232, 257.2, 321.86, 321.84, 652, 210/321.81, 323.2, 345, 455, 456, 457, 458, 210/459, 462, 463, 447

See application file for complete search history.

(56) References Cited

U.S. PATENT DOCUMENTS

| | | | |
|---|---|---|---|
| 3,774,771 A * | 11/1973 | Manjikian et al. ...... | 210/321.87 |
| 4,083,780 A | 4/1978 | Call | |
| 4,652,373 A * | 3/1987 | Trimmer ................ | 210/321.87 |
| 4,746,430 A | 5/1988 | Cooley | |
| 5,043,067 A | 8/1991 | Sorensen | |
| 5,059,374 A | 10/1991 | Krueger et al. | |
| 5,158,581 A | 10/1992 | Coplan | |
| 5,202,023 A | 4/1993 | Trimmer et al. | |
| 5,288,308 A | 2/1994 | Puri et al. | |
| 5,468,283 A | 11/1995 | French et al. | |
| 5,470,469 A | 11/1995 | Eckman | |
| 5,500,122 A | 3/1996 | Schwartz | |
| 5,520,807 A | 5/1996 | Myrna et al. | |
| 5,525,144 A | 6/1996 | Gollan | |
| 5,851,267 A | 12/1998 | Schwartz | |
| 6,495,037 B1 * | 12/2002 | Schuyler ..................... | 210/232 |
| 6,887,304 B2 * | 5/2005 | Stroh et al. ...................... | 96/8 |
| 6,926,829 B2 * | 8/2005 | Dannstrom et al. .... | 210/321.88 |
| 7,404,843 B2 * | 7/2008 | Kaschemekat et al. ......... | 95/45 |
| 2006/0124529 A1 | 6/2006 | Schott et al. | |

* cited by examiner

*Primary Examiner*—Tony G Soohoo
*Assistant Examiner*—David C Mellon
(74) *Attorney, Agent, or Firm*—Mark Goldberg (57) ABSTRACT

A separation system including a pressure vessel containing a plurality of membrane cartridge assemblies is provided for the separation of a fluid feed. The separation system typically includes an elongated pressure vessel having a feed stream inlet, a residual stream and at least one permeate stream outlet. Disposed within the pressure vessel are a first tube sheet assembly defining a first permeate reservoir, a first fluid reservoir, and a plurality of membrane cartridge assemblies. The first tube sheet assembly includes a first pair of tube sheets, which define the first permeate reservoir therebetween, and a plurality of first sleeves disposed between the first pair of tube sheets. The first permeate reservoir is in fluid communication with the at least one permeate stream outlet. The at least one membrane cartridge assembly includes a membrane cartridge and a first permeate adapter joined to a first end of the membrane cartridge.

6 Claims, 8 Drawing Sheets

MULTI-TUBE PRESSURE VESSEL

FIELD OF THE INVENTION

The present invention relates generally to fluid separation and, more particularly, to fluid separation via multiple membrane cartridges or modules disposed within a pressure vessel.

BACKGROUND OF THE INVENTION

A variety of commercial processes rely on the use of fluid separation techniques in order to separate one or more desirable fluid components from a mixture. In particular, various such processes may involve the separation of liquid mixtures, the separation of vapors or gases from liquids, or the separation of intermingled gases.

For example, in the production of natural gas, it is typically necessary for the producer to strip carbon dioxide from natural gas in order to meet government regulatory requirements. It is also typically desirable in many chemical processes for hydrogen to be removed and recovered from gaseous process streams.

The use of membranes for fluid separations has achieved increased popularity over other known separation techniques. Such membrane separations are generally based on relative permeabilities of various components of the fluid mixture, resulting from a gradient of driving forces, such as pressure, partial pressure, concentration and temperature. Such selective permeation results in the separation of the fluid mixture into portions commonly referred to as "retentate", e.g., generally composed of slowly permeable components, and "permeate", e.g., generally composed of faster migrating components.

Gas separation membranes are commonly manufactured in one of two forms: flat sheet or hollow fiber. The flat sheets are typically combined into a spiral wound element, whereas the hollow fibers are commonly bundled together in a manner similar to a shell and tube heat exchanger.

In typical spiral wound arrangements, two flat sheets of membrane with a spacer in between are joined, e.g., glued along three of their sides to form an envelope, i.e., a "leaf", that is open at one end. Many of these envelopes are separated by feed spacers and wrapped around a mandrel or otherwise wrapped around a permeate tube with the open ends of the envelopes facing the permeate tube. Feed gas enters along one side of the membrane and passes through the feed spacers separating the envelopes. As the gas travels between the envelopes, highly permeable compounds permeate or migrate into the envelope. These permeated compounds have only one available outlet: they must travel within the envelope to the permeate tube. The driving force for such transport is the pressure differential between the low permeate pressure and the high feed pressure. The permeated compounds enter the permeate tube, such as through holes passing through the tube. The permeated compounds then travel through the tube to join the permeated compounds from other of the tubes. Components of the feed gas that do not permeate or migrate into the envelopes leave the element through the side opposite the feed side.

In hollow fiber elements, very fine hollow fibers are wrapped around a central tube in a highly dense pattern. In such a wrapping pattern, both ends of the fiber end up at a permeate pot on one side of the element. Feed gas flows over and between the fibers, and some components of the feed gas permeate or migrate into the fibers. Such components then travel within the fiber until it reaches the permeate pot, where it mixes with permeated components from other of the fibers. The components collected in the permeate pot exit the element through a conduit or pipe. Components of the feed gas that do not permeate or migrate into the fibers eventually reach the central tube of the element, which is typically perforated similar to the permeate tube in the spiral wound element. In this case, however, the central tube is for residual or retentate collection, not permeate collection.

As will be appreciated, each element type has certain advantages. For example, spiral wound elements typically can handle higher pressures, are more resistant to fouling and have a long history in service in natural gas sweetening. In contrast, hollow fiber elements typically have higher packing density. Consequently, a hollow fiber-based installation is typically more advantageous for membranes with low permeability.

In either case, the membranes, once produced into elements, are typically formed into modules or cartridges, e.g., a tube containing a plurality of membrane separation elements. Modules can be used singly or, more commonly, interconnected in series or parallel arrangements or arrays. Typically, an installation may have from at least two up to several hundred modules in an array. Each module has an input (e.g., feed) stream, an output or residual stream that contains the substances which did not pass through the membrane separation element, and a permeate stream which contains the substances which pass through, e.g., permeate through, the membrane separation element.

Many such separation applications require rather high pressures. In many instances the pressures in such processes are in the range of about 35 kg/cm$^2$ to about 210 kg/cm$^2$ (about 500 psi to about 3000 psi). In dealing with such pressures, besides having sufficient wall thickness, it is necessary to have good pressure seals. The various process flow streams (e.g., feed, residual and permeate streams) must remain properly separated. Any intermingling of these streams decreases the efficiency of the process.

Current spiral wound membrane gas separation pressure vessel configurations are a product of the reverse osmosis industry, where such configurations have been the standard for many years. This vessel concept was designed for applications where filament wound plastic tubes could be easily incorporated, e.g., the internal diameter of the plastic tube could be easily manufactured to exact dimensions as the membrane web was wound over a mandrel.

The gas membrane industry has needed to modify the standard reverse osmosis vessel configuration to meet or satisfy their unique process requirements. For example, larger permeate pipes or conduits may be incorporated into some vessel configurations in order to better handle the larger possible permeate flows. Further, in order to meet the typical high pressure operation requirements associated with the gas processing industry and the tight roundness and diameter specification required for efficient packing of multiple modules, steel tubing has been employed with the internal diameter of the steel tubing honed to an appropriately high surface finish, e.g., 125 RMS or less.

In addition, an end draw configuration, such as used in reverse osmosis processing, has also typically been utilized in gas membrane separation applications. Such end draw configurations typically result in the permeate header extending out from the ends of the pressure tubes. Thus, such configurations generally result in a membrane skid being made longer than otherwise desired or in a reduction in length of the membrane tubes used therein, with a corresponding reduction in the capacity of the unit.

One of the difficulties in building such membrane skids is the need to ensure that the permeate header lines up perfectly with the flange connections at the end of the membrane pressure tube. Increasing the number of modules in an installation increases the number of flange connections that must properly aligned with a permeate header thereby increasing the difficulty of interconnecting individual modules.

In addition, a common problem associated with the use of spiral wound membranes is that each module containing the membranes is typically required to be machined to a close tolerance in order to assure good pressure seals. As a result, the cost for each module can be significantly increased.

In view of increased demand for product gases such as sweetened natural gas and purified gases such as hydrogen and carbon dioxide, the current market for gas separation membrane systems has moved toward larger installations. One approach to meet such increased demand is to incorporate membrane modules having an increased diameter to accommodate higher fluid flow rates. Alternatively, such larger installations may incorporate more membrane modules per skid to meet process specifications. However, the number of membrane modules loaded on an individual skid is controlled by the height and space limits at the installation site and the structural and weight limitations of individual skids and skid foundations.

Further, each of the membrane modules loaded on an individual skid requires some physical separation to accommodate installation of the individual membrane modules. Typically, membrane separation installations are constructed using a number of membrane separation modules which are stacked vertically to form a skid and create the required membrane area to process a fluid. This design requires a multitude of external connections to feed each individual membrane module and remove the processed fluid. As a result, packing of such large systems may present a problem because of the need to accommodate the input, output and permeate ports of each module.

Further such individual skids are constructed using structural steel to support each set of membrane modules. Such structural steel supports, however, add weight to the overall membrane system and increase the area required to install each individual skid. Consequently, such larger systems are heavier and more expensive to manufacture due to the quantity of materials needed to produce the structural steel supports, as well as, individual tubes for each module. Such larger systems are also more complex due to the increased number of connections between the membrane modules and common headers used to deliver and remove fluids from the skid.

Thus, there is a need and a demand for separation systems which incorporate an increased number of membrane cartridges or modules in a given area. In particular, there is a need and a demand for separation systems which incorporate multiple membrane cartridges into a single pressure vessel.

There is also a need and a demand for separation systems having simplified process fluid stream connections. Further, for example, there is a need and a demand for separation systems that permit feed stream delivery to, residual stream removal from, and permeate stream removal from a multitude of membrane cartridges at a reduced number of locations.

There is a further need and a demand for separation systems that are less expensive to produce.

SUMMARY OF THE INVENTION

A general object of the invention is to provide separation systems having one or more of a reduced skid footprint, reduced weight and simplified process connections.

A more specific objective of the invention is to overcome one or more of the problems described above.

The general object of the invention can be attained, at least in part, through a separation system for use in separation of a fluid feed via multiple membrane cartridges disposed within a pressure vessel. In accordance with one embodiment, such a separation system includes an elongated pressure vessel having a feed stream inlet, a residual stream outlet and at least one permeate stream outlet. Disposed within the pressure vessel are a first tube sheet assembly defining a first permeate reservoir, a first fluid reservoir disposed between the first tube sheet assembly and a first end of the pressure vessel, and a plurality of membrane cartridge assemblies extending between the first end of the pressure vessel and a second end of the pressure vessel. The first tube sheet assembly includes a first pair of tube sheets, which define the first permeate reservoir therebetween, and plurality of first sleeves disposed between the first pair of tube sheets. The first permeate reservoir is in fluid communication with the at least one permeate outlet stream. At least one of the membrane cartridge assemblies includes a membrane cartridge and a first permeate adapter joined to a first end of the membrane cartridge. The first permeate adapter is disposed within one of the first sleeves and is in fluid communication with the first fluid reservoir and the first permeate reservoir.

The prior art generally fails to provide separation systems having a sufficiently reduced skid footprint and/or which incorporate a desirably increased number of membrane cartridges or modules per a given area. Moreover, the prior art generally fails to provide separation systems having a sufficiently reduced number of process fluid stream connections. Further, the prior art generally fails to provide filtrations systems having sufficiently increased process capacity that are desirably less cumbersome and/or less expensive to manufacture.

The invention further comprehends a pressure vessel including an elongated housing containing a first fluid reservoir adjacent a first end of the housing, a second fluid reservoir adjacent a second end of the housing, a first permeate reservoir adjacent the first fluid reservoir defined by a first tube sheet assembly, a second permeate reservoir adjacent the second fluid reservoir defined by a second tube sheet assembly, and a cartridge chamber disposed between the first permeate reservoir and the second permeate reservoir. The pressure vessel further includes a feed stream inlet, a residual stream outlet, at least one first permeate stream outlet in fluid communication with the first permeate reservoir, and at least one second permeate stream outlet in fluid communication with the second permeate reservoir.

The first tube sheet assembly includes a first tube sheet, a second tube sheet and a plurality of first sleeves disposed therebetween. The second tube sheet assembly includes a third tube sheet, a fourth tube sheet and a plurality of second sleeves disposed therebetween. The plurality of second sleeves corresponds to the plurality of first sleeves.

The pressure vessel further contains a plurality of membrane cartridge assemblies disposed within the elongated housing and extending between the first fluid reservoir and the second fluid reservoir. Each membrane cartridge assembly includes a first permeate adapter, a membrane cartridge disposed within a membrane pressure tube, and a second permeate adapter. The first permeate adapter is joined to a first end of the membrane cartridge and is disposed within one of the first sleeves. The first permeate adapter is in fluid communication with the first end of the membrane cartridge, the first fluid reservoir and the first permeate reservoir. The second permeate adapter is joined to a second end of the membrane cartridge and is disposed within a corresponding second sleeve. The second permeate adapter is in fluid communication with the second end of the membrane cartridge, the second fluid reservoir and the second permeate reservoir.

The invention still further comprehends a separation system including a pressure vessel having a feed stream inlet, a residual stream outlet, and at least two permeate stream outlets. The pressure vessel contains a feed reservoir in fluid communication with the feed stream inlet, a first permeate reservoir defined by a first tube sheet assembly and in fluid communication with at least one first permeate stream outlet, a cartridge chamber, a second permeate reservoir defined by a second tube sheet assembly and in fluid communication with at least one second permeate stream outlet, and a residual reservoir in fluid communication with the residual stream outlet.

The first tube sheet assembly includes a first tube sheet, a second tube sheet and a plurality of first sleeves disposed therebetween. The second tube sheet assembly includes a third tube sheet, a fourth tube sheet and a plurality of second sleeves disposed therebetween. The plurality of second sleeves corresponds to the plurality of first sleeves.

The separation system further contains a plurality of membrane cartridge assemblies disposed within the pressure vessel and extending between the first fluid reservoir and the second fluid reservoir. Each membrane cartridge assembly includes a first permeate adapter including a plurality of first permeate discharge ports in fluid communication with the first permeate reservoir, a second permeate adapter including a plurality of second permeate discharge ports in fluid communication with the second permeate reservoir, and a membrane cartridge including a permeate passage tube extending from a first end to a second end of the membrane cartridge.

The first permeate adapter is disposed within one of the first sleeves and is in fluid communication with the feed reservoir. The first permeate adapter is joined to the first end of the membrane cartridge and further joined to a first end of the permeate passage tube. The second permeate adapter is disposed within a corresponding second sleeve and is in fluid communication with the residual reservoir. The second permeate adapter is joined to the second end of the membrane cartridge and is further joined to a second end of the permeate passage tube.

The invention also comprehends a permeate adapter for use within a pressure vessel. The permeate adapter includes a front portion, a back portion and a body portion extending between the front portion and the back portion. The body portion defines a central blind bore for receiving an end of a permeate passage tube of a membrane cartridge, a plurality of permeate discharge ports extending radially from the central blind bore to an outer surface of the body portion, and a plurality of fluid ports extending parallel to the central blind bore from the front portion to the back portion of the permeate adapter. The fluid ports are disposed between adjacent permeate discharge ports.

As used herein, the terms "central blind bore" or "blind bore" refer to a passage formed partially, but not completely, through an object from a first end toward a second end of the object. The second end of the object forms or acts as a cap or a seal which effectively closes one end of the passage and precludes fluids from entering or exiting the second end of the object.

The invention additionally comprehends a separation system including an elongated pressure vessel, a plurality of membrane cartridge assemblies disposed within the pressure vessel and extending from a first end to a second end of the pressure vessel, and plurality of permeate headers extending through the pressure vessel perpendicular to the plurality of membrane cartridges. The pressure vessel includes a feed stream inlet, a residual stream outlet and a plurality of permeate stream outlets. At least one of the membrane cartridge assemblies includes a first permeate adapter and a membrane cartridge, the first permeate adapter joined to a first end of the membrane cartridge. Each permeate header is in fluid communication with a first permeate stream outlet, a second permeate stream outlet, and at least one membrane cartridge assembly. The permeate headers may include a plurality of adapter notches for receiving one or more corresponding first permeate adapters. The permeate headers may also include an internal header portion disposed within the pressure vessel which is releasably attached to the first permeate stream outlet and the second permeate stream outlet.

Other objects and advantages will be apparent to those skilled in the art from the following detailed description taken in conjunction with the appended claims and drawings.

DETAILED DESCRIPTION

The present invention provides a separation system for use in separation of a fluid feed via a plurality of membrane cartridges or modules disposed within a pressure vessel. As described in greater detail below, the invention provides separation systems having improved packing and reduced space requirements. Moreover, in accordance with certain embodiments, the invention provides separation systems that are lighter and less expensive to manufacture. Further, in accordance with certain embodiments, the invention provides separation systems having simplified and/or a reduced number of process stream connections.

Figure 1:
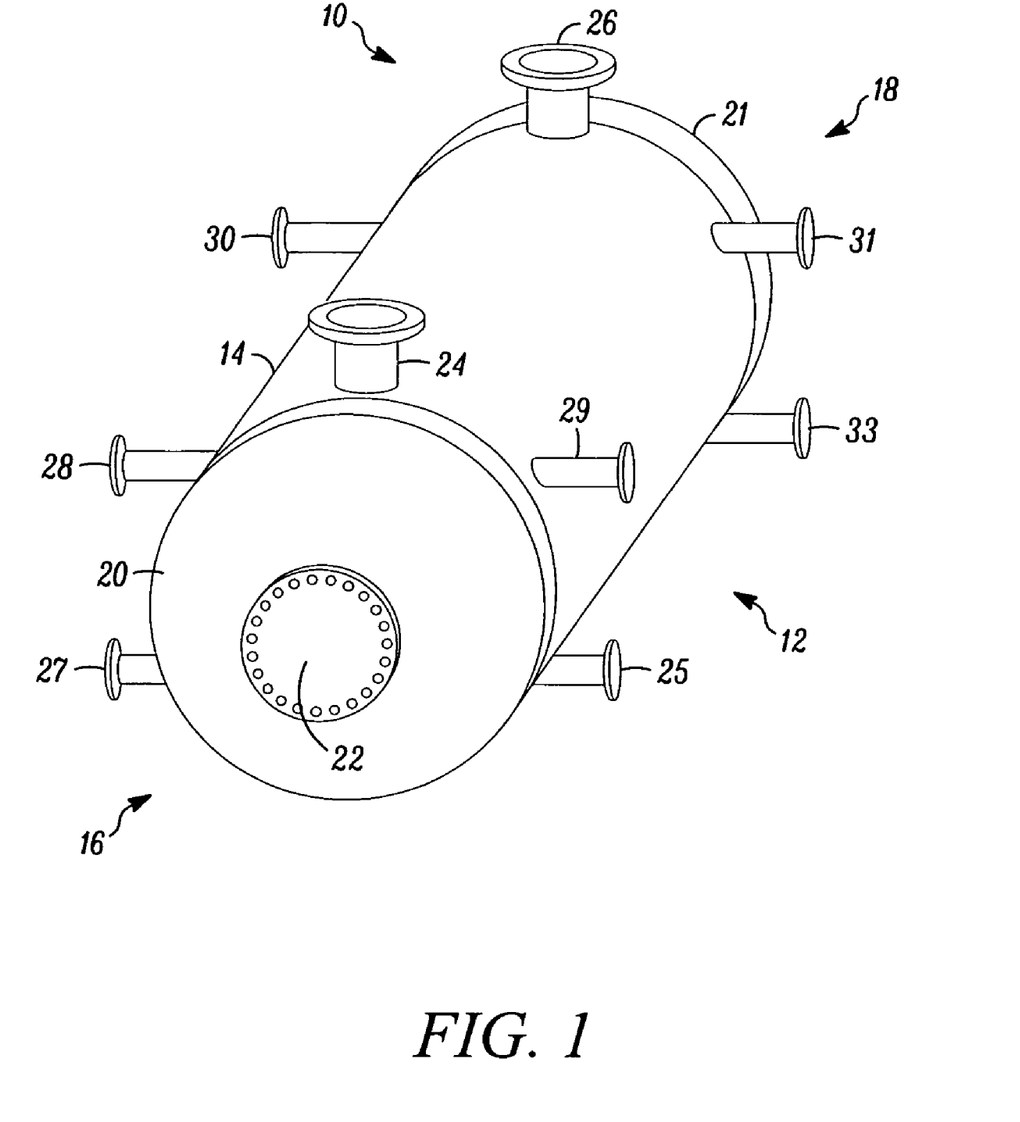
FIG. 1 is a perspective view of a separation system in accordance with one embodiment.

Those skilled in the art, and guided by the teachings herein provided, will appreciate that the present invention may be practiced or embodied by, in or with separation systems having a variety of different specific structures. As representative, FIG. 1 illustrates a separation system, generally designated by the reference numeral 10, in accordance with one embodiment. While separation systems in accordance with the invention may find various uses, the invention is believed to have particular utility for use in or with the separation of one or more gases from a mixture of gases. It is to be understood, however, that the broader practice of the invention is not necessarily limited to use for the separation of gases from a mixture of gases. Other fluid separations such as, for example, liquid separations by reverse osmosis processing can, if desired, also be practiced employing separation systems in accordance with the invention.

Returning to FIG. 1, the separation system 10 includes a pressure vessel 12. The pressure vessel 12 is suitably in the form of an elongated housing having a generally cylindrical or tubular cylindrical center section 14. The center section 14 of the pressure vessel 12 may generally be constructed to have any size suitable to house a desired plurality of membrane cartridge assemblies. Those skilled in the art and guided by the teachings herein provided will appreciate that the inner diameter of pressure vessels in accordance with the invention may be adjusted to accommodate various operation and process conditions to achieve a desired flow per membrane cartridge assembly and to meet the required product specification.

In accordance with one embodiment, the center section 14 of the pressure vessel 12 may have an inner diameter of about 0.6 m (2 ft.) to about 6.1 m (20 ft.). In accordance with another embodiment the center section 14 of the pressure vessel 12 may have an inner diameter of about 1.8 m (6 ft.) to about 6.1 m (20 ft.). In a further embodiment, the center section 14 of the pressure vessel 12 may have an inner diameter of about 1.8 m (6 ft.) to about 4.3 (14 ft.).

Each of a first end 16 and/or a second end 18 of the pressure vessel 12 may be terminated with a hemispherical or semihemispherical head 20 and 21, respectively. The head 20 and/or the head 21 may include a manway, 22 and 23, respectively, to provide access to the interior of the pressure vessel 12. Alternatively, one of the first or second ends, 16 and 18, respectively, may be closed to the atmosphere such as by way of a blind flange (not shown) which forms a solid end cover at one of the first or second ends, 16 and 18, respectively, of the pressure vessel 12.

Those skilled in the art, and guided by the teachings herein provided, will appreciate that pressure vessels in accordance with the invention can be constructed from various suitable materials, such as various metals or metal alloys, desirably at least relatively inert to the fluid stream materials passing therethrough. For example, stainless steel in the form of a plate having a thickness of about 5 cm to about 15.25 cm (about 2 to abut 6 inches) may be rolled or otherwise used to form the pressure vessel 12 in accordance with one embodiment. Alternatively, pressure vessels in accordance with the invention can be constructed of other metallic materials such as, for example, aluminum, carbon steel and/or stainless steel. In accordance with certain embodiments, the pressure vessel 12 can withstand pressures up to about 15.2 MPa (about 2200 psi).

The pressure vessel 12 includes a feed stream inlet or port 24 adjacent or near the pressure vessel first end 16 and a residual stream outlet or port 26 adjacent the pressure vessel second end 18. FIG. 1 depicts both the feed stream inlet 24 and the residual stream outlet 26 oriented vertically. However, one of skill in the art, and guided by the teachings herein provided, would understand and appreciate that the feed stream inlet 24 and/or the residual stream outlet 26 may be appropriately disposed anywhere about the circumference of the pressure vessel 12 adjacent the respective desired pressure vessel first end 16 and/or the pressure vessel second end 18.

In another embodiment, both the feed stream inlet 24 and the residual stream outlet 26 may be adjacent the pressure vessel first end 16 or the second pressure vessel end 18. In a further embodiment, the pressure vessel 12 may include multiple feed stream inlets and/or residual stream outlets located about the circumference of the pressure vessel adjacent the pressure vessel first end 16 and/or the pressure vessel second end 18.

The pressure vessel 12 further includes at least one first permeate stream outlet or port 28 adjacent or near the pressure vessel first end 16. For example, referring to FIG. 1, the pressure vessel 12 includes four first permeate stream outlets, 25, 27, 28 and 29, respectively. Additionally or alternatively, the pressure vessel 12 may include at least one second permeate stream outlet or port 30 adjacent or near the pressure vessel second end 18. For example, the pressure vessel 12 illustrated in FIG. 1 also includes four second permeate stream outlets, three of which are visible, 30, 31 and 33, respectively. The second permeate stream outlets are arranged in a manner similar to the first permeate stream outlets, 25, 27, 28 and 29, respectively. Those skilled in the art, and guided by the teachings herein provided, will understand and appreciate that the number of first and/or second permeate stream outlets, 28 and 30, respectively, may vary depending upon the particular application and/or process specification.

Those skilled in the art, and guided by the teachings herein provided, will further understand and appreciate that the first and/or second permeate stream outlets, 28 and 30, respectively, can desirably be disposed at appropriate select locations about the circumference of the pressure vessel 12 and radially extending therefrom, such as shown in FIG. 1. In particular, FIG. 1 shows the first permeate stream outlets 28 and the second permeate stream outlets 30 as extending from the pressure vessel 12 perpendicular to the feed stream inlet 24 and the residual stream outlet 26.

Figure 2:
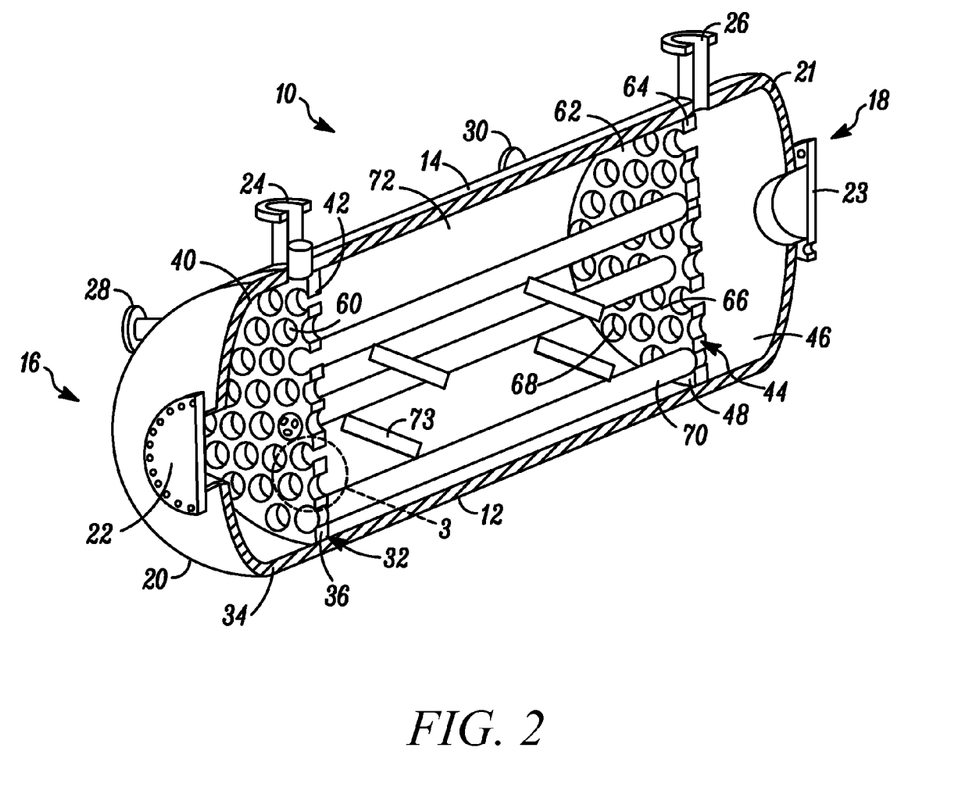
FIG. 2 is a cross-sectional side view of the separation system shown in FIG. 1.

Turning to FIG. 2, the separation system 10 further includes a first tube sheet assembly 32 disposed within the pressure vessel 12 adjacent the pressure vessel first end 16. The first tube sheet assembly defines a first fluid reservoir 34 disposed between the pressure vessel first end 16 and the first tube sheet assembly 32 and a first permeate reservoir 36. The first fluid reservoir 34 is in fluid communication with the feed stream inlet port 24 and the first permeate reservoir 36 is in fluid communication with at least one permeate stream outlet 28.

In one embodiment, the first fluid reservoir 34 may be a feed reservoir and the second fluid reservoir 46 may be a residual reservoir. Alternatively, the first fluid reservoir 34 may be a residual reservoir and the second fluid reservoir 46 may be a feed reservoir.

Figure 3:
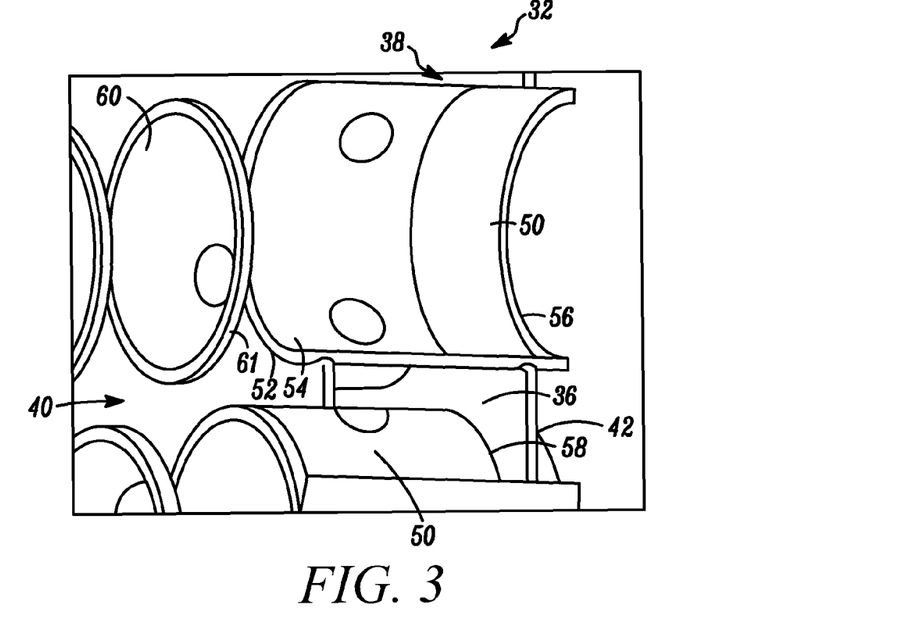
FIG. 3 is a detail view of section 3 shown in FIG. 2.

As shown in detail in FIG. 3, the first tube sheet assembly 32 includes a first pair of tube sheets 38, which includes a first tube sheet 40 and a second tube sheet 42, which define the first permeate reservoir 36 therebetween. The first tube sheet assembly 32 further includes a plurality of first sleeves 50 disposed between the first tube sheet 40 and the second tube sheet 42. The first tube sheet 40 has a plurality of first openings 54 formed therethrough and the second tube sheet 42 has a plurality of corresponding second openings 58 formed therethrough.

Each first sleeve 50 has a first end 52 disposed within and extending through one of the first openings 54 in the first tube sheet 40 and a second end 56 disposed within and extending through the corresponding second opening 58 in the second tube sheet 42 forming a plurality of first channels 60 which extend through the first tube sheet assembly 32.

Figure 4:
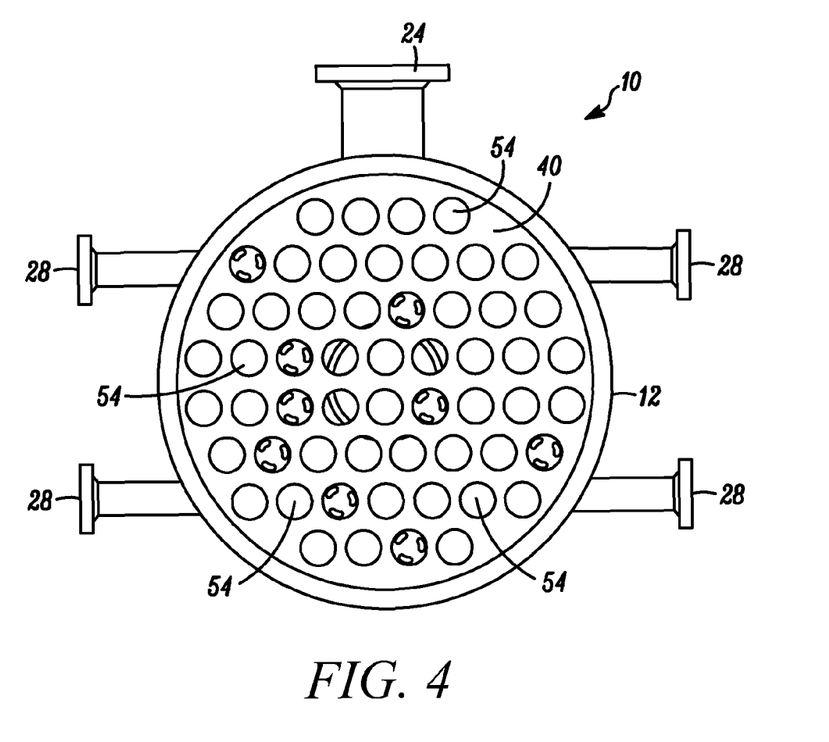
FIG. 4 is a cross-sectional end view of the separation system shown in FIG. 1.

The first openings 54 and the corresponding second openings 58 may be arranged in any suitable pattern, array or arrangement. For example, as illustrated in FIG. 4, the first openings 54 in tube sheet 40 may be formed in a honeycomb-like pattern. Accordingly, the second tube sheet 42 would have a corresponding honeycomb-like pattern of the second openings 58. In accordance with certain embodiments, the first and second openings 54 and 58, respectively, can be laid out such that the first sleeves 50 are arranged in a manner similar to that of a heat exchanger.

The first and second tube sheets, 40 and 42, respectively, are held in place and at a proper or desired distance from each other by the first sleeves 50. For example, in accordance with one embodiment, the first sleeves 50 may be configured to maintain a distance between the first tube sheet 40 and the second tube sheet 42 of about 10.2 cm (about 4 inches) to about 91.4 cm (about 36 inches.). In accordance with another embodiment, the first sleeves 50 may be configured to maintain a distance between the first tube sheet 40 and the second tube sheet 42 of about 15.2 cm (about 6 inches) to about 45.7 cm (about 18 inches). In accordance with a further embodiment, the first sleeves 50 may be configured to maintain a distance between the first tube sheet 40 and the second tube sheet 42 of about 17.8 cm (about 7 inches).

Suitably, as shown in FIG. 3, the first sleeves 50 are welded or otherwise permanently joined to the first tube sheet 40 and the second tube sheet 42 such as by a structural and sealing joint 61. The first sleeves 50 generally create a structural support system that reacts to loads on the first and second tube sheets, 40 and 42, respectively, created by differential pressures within the pressure vessel 12.

In accordance with certain embodiments, the first and second tube sheets, 40 and 42, respectively, can be constructed or fabricated from a metallic material such as, for example, aluminum, carbon steel, stainless steel or a combination thereof. Similarly, the first sleeves 50 can be constructed or fabricated from a metallic material such as, for example, aluminum, carbon steel, stainless steel or a combination thereof.

The first tube sheet assembly 32 may further include structural support members (not shown) extending between the first tube sheet 40 and the second tube sheet 42 and disposed between, around or next to adjacent sleeves 50 to provide additional structural stability to the first tube sheet assembly 32. Such structural support members may be constructed, for example, from schedule 80 carbon steel pipe having a diameter of about 5 cm (about 2 inches).

In accordance with certain embodiments, the pressure vessel 12 may also include a second tube sheet assembly 44 disposed within the pressure vessel 12 adjacent the pressure vessel second end 18. The second tube sheet assembly 44 defines a second fluid reservoir 46 disposed between the second tube sheet assembly 44 and the pressure vessel second end 18 and a second permeate reservoir 48. The second fluid reservoir 46 is in fluid communication with residual stream outlet 26 and the second permeate reservoir 48 is in fluid communication with at least one second permeate stream outlet 30.

As will be understood and appreciated by those skilled in the art, and guided by the teachings herein provided, the second tube sheet assembly 44 may be constructed in a manner similar to the first tube sheet assembly 32, as shown in FIGS. 2 and 3. In particular, as illustrated in FIG. 2, the second tube sheet assembly 44 may include a second pair of tube sheets, which includes a third tube sheet 62 and a fourth tube sheet 64, which define the second permeate reservoir 48 therebetween. The second tube sheet assembly 44 further includes a plurality of second sleeves 66 disposed between the third tube sheet 62 and the fourth tube sheet 64. The third tube sheet 62 has a plurality of third openings formed therethrough and the fourth tube sheet 64 has a plurality of corresponding fourth openings formed therethrough.

Each second sleeve 66 has a first end disposed within and extending through one of the third openings in the third tube sheet 62 and a second end disposed within and extending through the corresponding fourth opening in the fourth tube sheet 64 forming a plurality of second channels 68 which extend through the second tube sheet assembly 44. As shown in FIG. 2, the plurality of first channels 60 generally correspond to the plurality of second channels 68.

Figure 5:
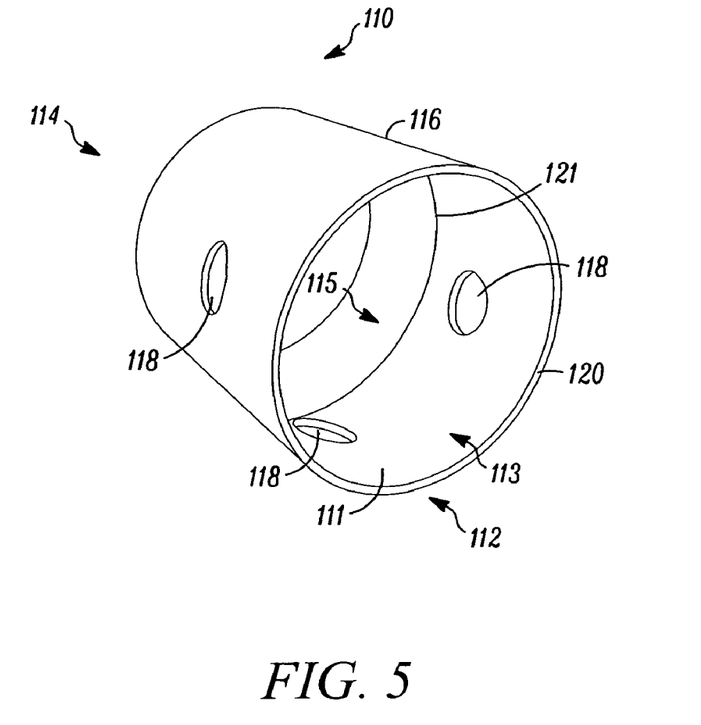
FIG. 5 is a perspective view of a sleeve for use in the tube sheet assembly shown in FIG. 3.

FIG. 5 illustrates, in greater detail, an sleeve 110 in accordance with a preferred embodiment and, as described further herein, which advantageously permits or otherwise allows permeate material to be carried into an associated permeate reservoir. The sleeve 110 includes a first end 112, a second end 114 and a body portion 116 extending between the first end 112 and the second end 114. The body portion 116 is suitably in the form of a tube or otherwise hollow structure such as forms one of the first channels 60 which extends through the first tube sheet assembly 32 or one of the second channels 68 which extends through the second tube sheet assembly 44, as shown in FIG. 2.

The body portion 116 of the sleeve 110 includes at least one permeate exit opening 118 formed therethrough to permit permeate material to be carried into an associated permeate reservoir. For example, as illustrated in FIG. 5, the sleeve 110 may include three permeate exit openings 118 formed through the body portion 116. Those skilled in the art, and guided by the teachings herein provided, will understand and appreciate, however, that the sleeve 110 may include two, three, four or more permeate exit openings 118 to accommodate desired process specifications.

The body portion 116 of the sleeve 110 further includes a first sealing area 113 disposed between the first end 112 and the at least one permeate exit opening 118 and/or a second sealing area 115 disposed between the second end 114 and the at least one permeate exit opening 118 to restrain or maintain an associated permeate adapter within the sleeve.

The first sealing area 113 can include a retaining clip groove 120 formed or cut into an inner surface 111 of the sleeve which restrains or maintains an associated permeate adapter within the sleeve. The second sealing area 115 can also include a retaining clip groove 121 formed or cut into the inner surface 111 of the adapter sleeve which restrains or maintains an associated permeate adapter within the sleeve 110.

Alternatively or additionally, the body portion 116 of the sleeve 110 can include at least one hole, aperture or opening (not shown) formed or cut through the body portion 116 of the sleeve 110 generally associated with the first and/or second sealing areas, 113 and 115, respectively, for receiving a pin which restrains or maintains an associated permeate adapter within the sleeve 110.

Returning to FIG. 2, the separation system 10 further includes a plurality of membrane cartridge assemblies 70 disposed within the pressure vessel 12 and extending between the pressure vessel first end 16 and the pressure vessel second end 18. In accordance with certain embodiments, at least a portion of the membrane cartridge assemblies 70 are disposed within a cartridge chamber 72 disposed between the first tube sheet assembly 32 and the second tube sheet assembly 44.

The separation system 10, as shown in FIG. 2, is generally known or referred to as a single-pass system. In practice, a fluid is fed to the first fluid reservoir 34 via the feed stream inlet 24. The fluid passes into the membrane cartridge assemblies 70, wherein select components of the fluid permeate through membrane separation elements contained within the membrane cartridge assemblies 70 and are collected in the first permeate reservoir 36 and/or the second permeate reservoir 48 and are removed from the separation system via the at least one first permeate stream outlet 28 and/or the at least one second permeate stream outlet 30. Non-permeate or residual components of the fluid exit the membrane cartridge assemblies 70 and are collected in the second fluid reservoir 46. The non-permeate or residual fluid is removed from the separation system via the residual stream outlet 26.

Figure 6:
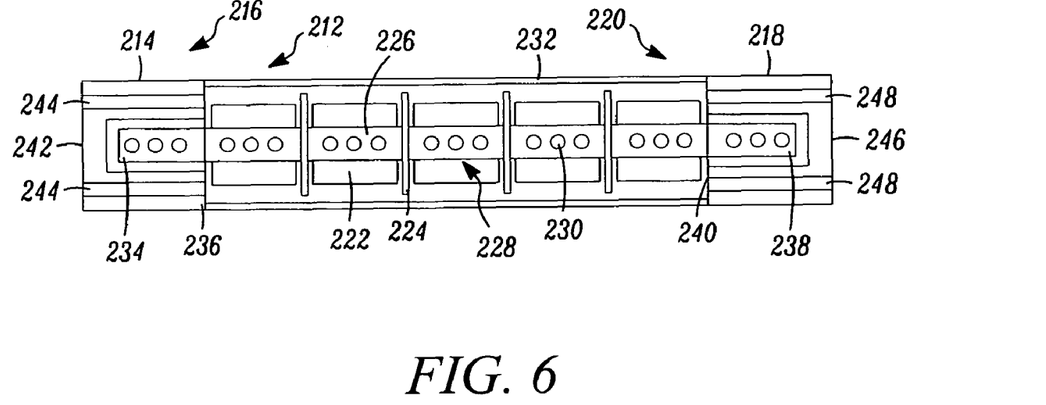
FIG. 6 is a cross-sectional view of a membrane cartridge assembly for use in the separation system shown in FIG. 1.

FIG. 6 illustrates, in greater detail, a membrane cartridge assembly 210 in accordance with certain embodiments. The membrane cartridge assembly 210 includes a membrane cartridge 212 which may contain one or more membrane separation elements 222. The membrane cartridge 212 illustrated in FIG. 6, for example includes five membrane separation elements 222 which are joined sequentially or in series. It will be understood and appreciated by those skilled in the art, and guided by the teaching herein provided, that the number of membrane separation elements 222 employed in particular membrane cartridge assemblies 210 is generally application dependent.

Individual membrane separation elements 222 may be interconnected by a clamp or other selected connection or coupling, such as designated by reference numeral 224. One suitable connection or coupling 224 for interconnecting individual membrane separation elements 222 is disclosed, for example, in commonly assigned U.S. Pat. No. 5,851,267.

Each membrane separation element 222 includes a central permeate tube 226 which, when the membrane separation elements 222 are interconnected, form, at least in part, a generally centrally disposed permeate passage tube 228 which extends through the membrane cartridge 212 from a first end 216 to a second end 220. The central permeate tubes 226 include a plurality of perforations 230 for receiving fluid which permeates through the membrane separation elements 222.

In accordance with certain preferred embodiments, the membrane cartridge 212 may advantageously include a membrane pressure tube 232 which provides support for the membrane cartridge assemblies 210 and prevents the membrane cartridges 212 from sagging. Additionally, the membrane pressure tube 232 generally seals a feed side of the membrane separation elements 222 from a residual side of the membrane separation element 222.

The membrane pressure tube 232 may be in the form of a cylindrical tube which houses or contains the membrane separation elements 222. The membrane pressure tube 232 may be constructed from various metallic materials, such as, for example, aluminum, carbon steel, and/or stainless steel, or non-metallic materials such as, for example, carbon fiber reinforced polymer materials. In accordance with certain embodiments, the membrane pressure tube 232 is constructed from light-weight materials and may withstand pressures of about 3.5 to about 7.0 kg/cm$^2$ (about 50 to about 100 psi).

The membrane cartridge assembly 210 includes a first permeate adapter 214 joined to the first end 216 of the membrane cartridge 212. The first permeate adapter may be further joined to a first end 234 of the permeate passage tube 228.

In accordance with certain embodiments, the membrane cartridge assembly 210 may further include a second permeate adapter 218 joined to a second end 220 of the membrane cartridge 212. The second permeate adapter 218 may be further joined to a second end 238 of the permeate passage tube 228.

In accordance with certain embodiments, the cartridge chamber 72, such as shown in FIG. 2, may include a plurality of racks or intermediate supports 73 to provide support for the membrane cartridge assemblies 70. Such racks prevent the portion of the membrane cartridge assemblies 70 disposed within the cartridge chamber 72, from sagging which alleviates or eliminates stress on the couplings between the membrane cartridge 70 and associated first and/or second permeate adapters.

In accordance with certain other embodiments which employ the membrane cartridge assemblies 210, as illustrated in FIG. 6, the membrane pressure tube 232 prevents the portion of the membrane cartridge assembly 210 within the cartridge chamber from sagging which alleviates or eliminates stress on the couplings between the membrane cartridge 212 and the first and/or second permeate adapters, 214 and 218, respectively. In such embodiments, racks or intermediate supports can be optionally removed.

The racks 73 may be positioned at intervals within the cartridge chamber 72 and may extend horizontally across a width of the cartridge chamber 72. For example, the racks may be constructed from tubing having square or round cross section or from angle bars that are disposed across the width of the cartridge chamber at about 1.2 to about 1.8 meter (about 4 to about 6 foot) intervals.

Alternatively, the racks may extend down a length of the cartridge chamber 72 (not shown). For example, the racks may be constructed from half tubes having a semi-circular or triangular cross-section that extend from a first end to a second end of the cartridge chamber, e.g., from the first tube sheet assembly 32 to the second tube sheet assembly 44, as shown in FIG. 2.

Figure 7:
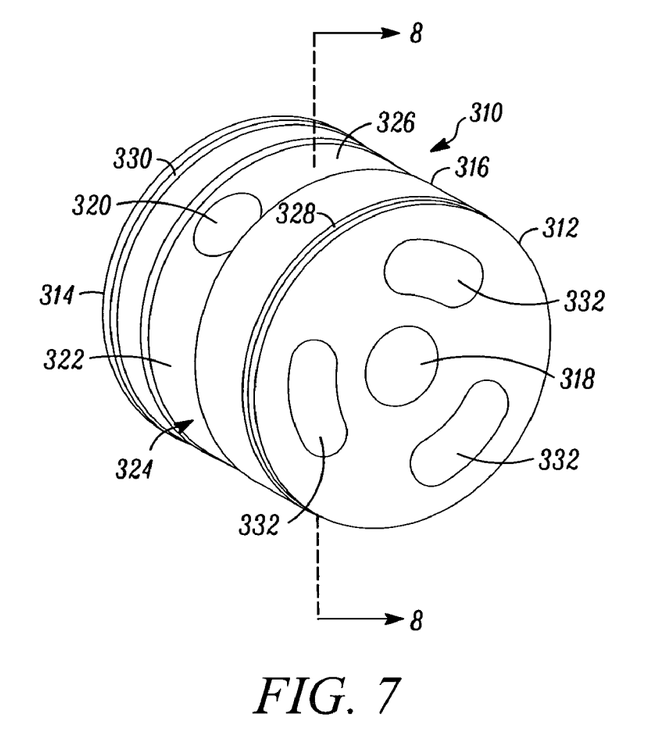
FIG. 7 is a front perspective view of a permeate adapter in accordance with one embodiment.
Figure 8:
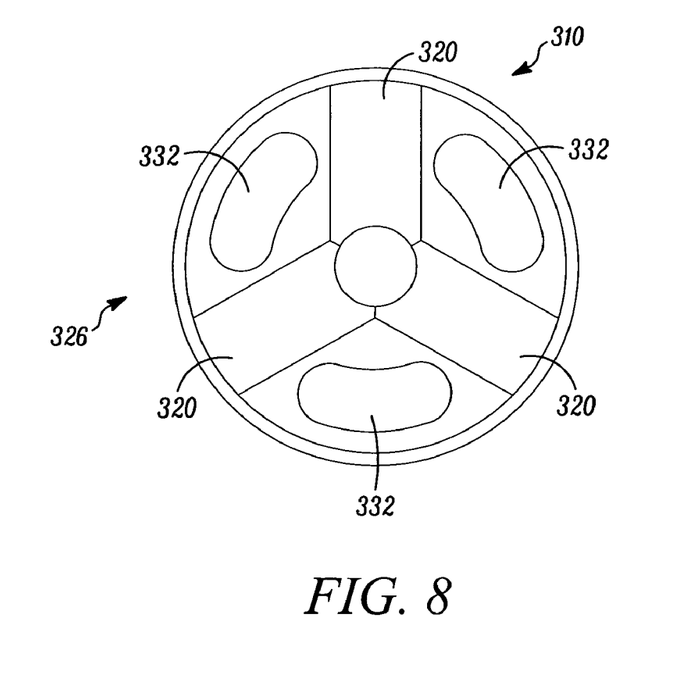
FIG. 8 is cross-sectional view, taken across line 8-8, of the permeate adapter shown in FIG. 7.
Figure 9:
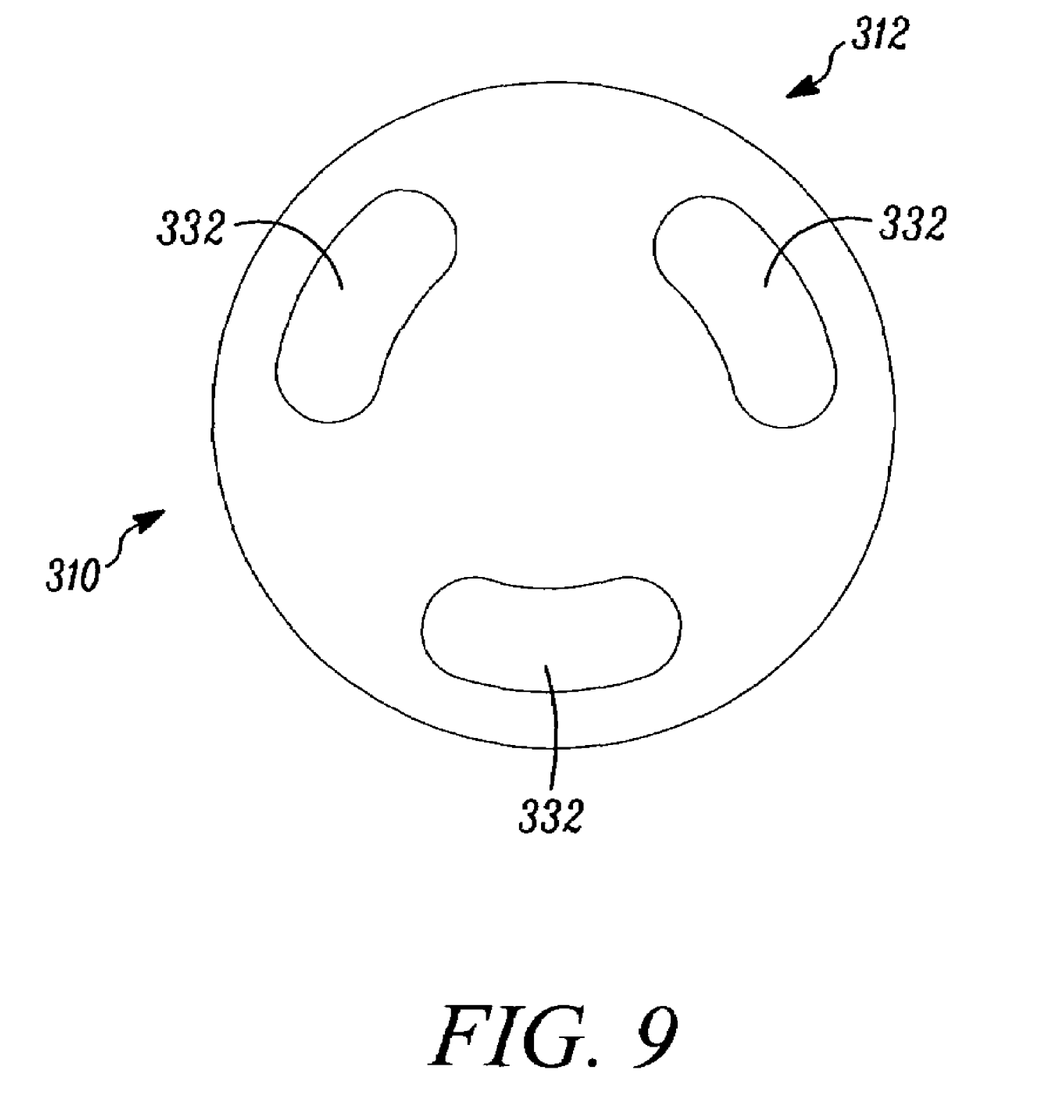
FIG. 9 is a back view of the permeate adapter shown in FIG. 7.

FIGS. 7-9 illustrate, in greater detail, a permeate adapter 310 in accordance with a preferred embodiment and, as described further herein, advantageously permits or otherwise allows permeate material to be carried out of a membrane cartridge into an associated permeate reservoir. The permeate adapter 310 has or includes a front portion 312, an oppositely disposed back portion 314 and a body portion 316 extending between the front portion 312 and the back portion 314. The body portion defines a central blind bore 318 for receiving a respective end of an associated permeate passage tube such as, for example, the first end 234 or the second end 238 of the permeate passage tube 228, shown in FIG. 6. As perhaps can be best seen in FIGS. 7 and 9, the back portion 314 forms a seal or cap such that the central blind bore 318 does not extend fully through the permeate adapter 310.

The body portion 316 of the permeate adapter 310 further includes at least one permeate discharge port 320 disposed therein and extending radially from the central blind bore 318 to an outer surface 322 of the body portion 316. For example, as shown in FIG. 8, the permeate adapter 310 may include three permeate discharge ports 320 disposed about and extending radially from the central blind bore 318. Those skilled in the art, and guided by the teaching herein provided, will understand and appreciate that the permeate adapter 310 may include fewer than or more than three permeate discharge ports 320 depending upon the size of the adapter and/or the process in which the permeate adapter 310 is employed.

Returning to FIG. 7, the body portion 316 of the permeate adapter 310 further includes a center section 324 which is undercut to form a permeate annulus 326 for receiving permeate materials from the permeate discharge port 320. Suitably, the body portion 316 of the permeate adapter 310 includes a first seal groove 328 adjacent the front portion 312 containing a first O-ring and a second seal groove 330 adjacent the back portion 314 containing a second O-ring. Once the permeate adapter 310 is disposed within an associated sleeve, such as, for example, one of the first sleeves 50 or one of the second sleeves 66, shown in FIG. 2, the first O-ring disposed in first seal groove 328 forms a seal between the permeate adapter 310 and the associated sleeve whereby the central section 324 of the permeate adapter 310 is isolated from an associated cartridge chamber such as, for example, cartridge chamber 72, as shown in FIG. 2. Additionally, once the permeate adapter 310 is disposed within the associated sleeve, the second O-ring disposed in the second seal groove 330 forms a seal between the permeate adapter 310 and the associated sleeve whereby the central section 324 of the permeate adapter 310 is isolated from an associated fluid reservoir such as, for example, the first fluid reservoir 34 or the second fluid reservoir 46, as shown in FIG. 2.

Further, once the permeate adapter 310 is disposed within an associate sleeve such as, for example, sleeve 110, as shown in FIG. 5, the permeate discharge openings 320 of the permeate adapter 310 are at least partially aligned with permeate exit openings 118 of the associated sleeve 110.

In practice, the permeate adapter 310, once joined to a respective end of an associated permeate passage tube, places an associated membrane cartridge such as, for example, membrane cartridge 212, as shown in FIG. 6, in fluid communication with an associated permeate reservoir via the central blind bore 318, the permeate discharge ports 320 and the permeate annulus 326. Further, the back portion 314 of the permeate adapter 310 is placed in fluid communication with an associated fluid reservoir such as, for example, the first fluid reservoir 34 or the second fluid reservoir 46, as shown in FIG. 2, and the front portion 312 of the permeate adapter 310 is placed in fluid communication with an end of the associated membrane cartridge such as, for example, the first end 216 or the second end 220 of the membrane cartridge 212, as shown in FIG. 6.

Returning to FIG. 7, the permeate adapter 310 further includes at least one fluid port 332 extending parallel to the central blind bore 318 from the front portion 312 to the back portion 314 of the permeate adapter 310 and disposed between adjacent permeate discharge ports 320. For example, as shown in FIG. 8, the permeate adapter 310 may include three fluid ports 332. One skilled in the art, and guided by the teachings herein provided, will understand and appreciate that the permeate adapter 310 may include fewer than or more than three fluid ports 332 depending upon the size of the adapter and/or the process in which the permeate adapter 310 is employed. In practice, the fluid ports 332 are in fluid communication with an associated fluid reservoir such as, for example, first fluid reservoir 34 or second fluid reservoir 46, as shown in FIG. 2 and are in fluid communication with an end of an associated membrane cartridge such as, for example, the first end 216 or the second end 220 of the membrane cartridge 212, as shown in FIG. 6.

In practice, referring to FIG. 6, a fluid to be separated is fed to a back portion 242 of the first permeate adapter 214. The fluid passes through first fluid ports 244 into the first end 216 of membrane cartridge 212. Select components of the fluid permeate through the membrane separation elements 222 and are collected in the permeate passage tube 228. The permeated components are carried into the first and/or second permeate adapters, 214 and 218, via the permeate passage tube 228 where they are discharged from the first and/or second permeate adapters into an associate permeate reservoir via permeate discharge ports, such as are shown in FIG. 7. Non-permeate or residual components in the fluid are carried out of the second end 220 of the membrane cartridge 212 into the second permeate adapter 218 where they exit a back portion 246 of the second permeate adapter 218 via second fluid ports 248.

Figure 10:
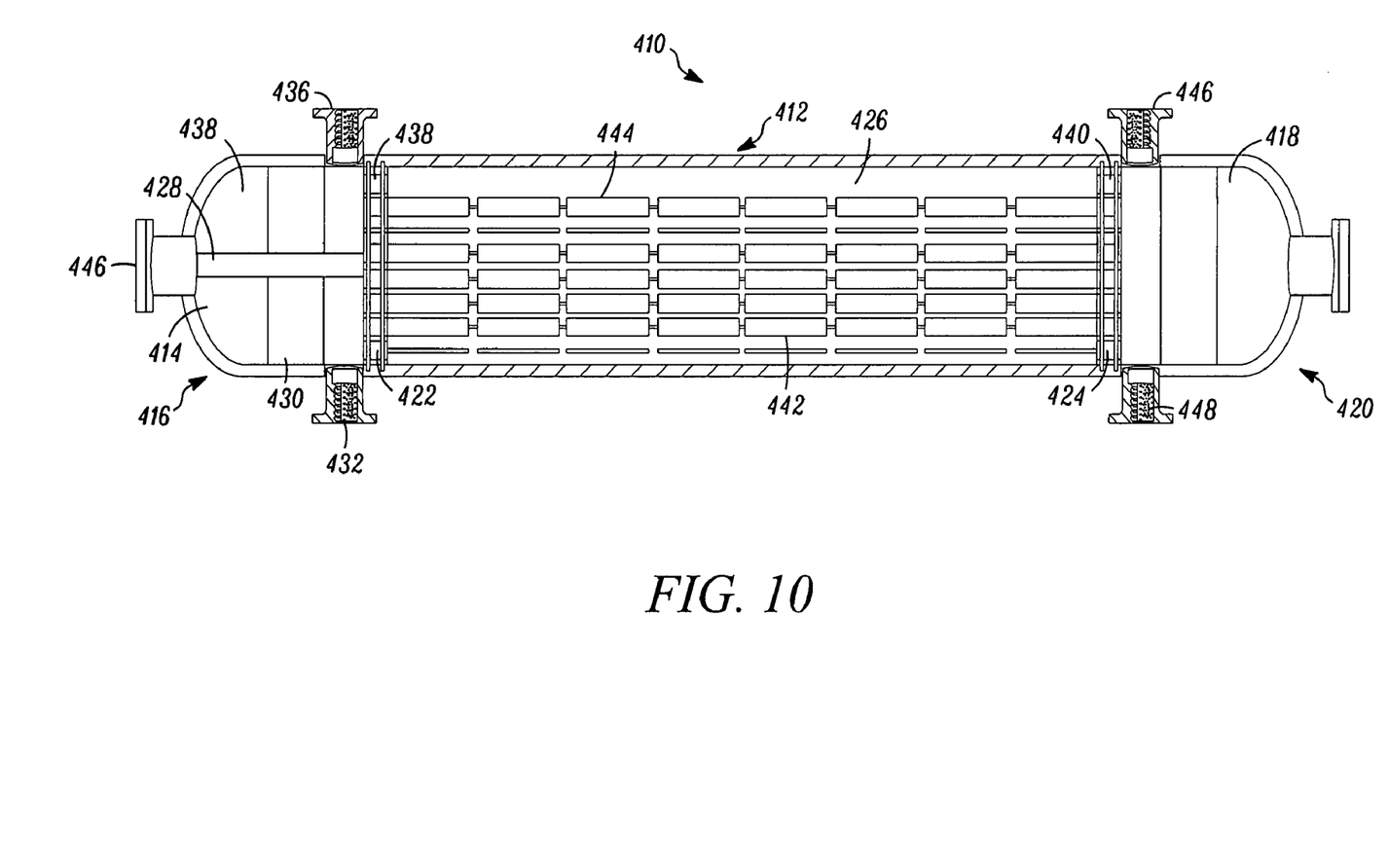
FIG. 10 is a cross-sectional side view of a separation system in accordance with another embodiment.

In an alternative embodiment, as shown in FIG. 10, a separation system 410 includes a pressure vessel 412 containing a first fluid reservoir 414 adjacent a first end 416 of the pressure vessel 412, a second fluid reservoir 418 adjacent a second end 420 of the pressure vessel 412, a first tube sheet assembly 422 adjacent the first fluid reservoir 414, a second tube sheet assembly 424 adjacent the second fluid reservoir 418, and a cartridge chamber 426 disposed between the first tube sheet assembly 422 and the second tube sheet assembly 424.

The first fluid reservoir 414 contains a divider plate 428 extending from the first end 416 of the pressure vessel 412 to the first tube sheet assembly 422. The divider plate 428 defines a feed chamber 430 in fluid communication with a feed stream inlet 432 and a residual chamber 434 in fluid communication with a residual stream outlet 436. In accordance with certain embodiments, the second fluid reservoir 418 may be in fluid communication with at least one fluid stream port 446.

The first and second tube sheet assemblies, 422 and 424, respectively, define a first permeate reservoir 438 and a second permeate reservoir 440, respectively. The first permeate reservoir 438 is in fluid communication with at least one first permeate stream outlet (not shown) and the second permeate reservoir 440 is in fluid communication with at least one second permeate stream outlet (not shown).

The cartridge chamber 426 includes at least one first membrane cartridge assembly 442 and at least one second membrane cartridge assembly 444. The at least one first membrane cartridge assembly 442 and the at least one second membrane cartridge assembly 444 may be constructed such as described herein and shown in FIG. 6. The at least one first membrane cartridge assembly 442 extends from the first tube sheet assembly 422 to the second tube sheet assembly 424 and is in fluid communication with the feed chamber 430, the first permeate reservoir 438, the second permeate reservoir 440, and the second fluid reservoir 418. The at least one second membrane cartridge assembly 444 extends from the first tube sheet assembly 422 to the second tube sheet assembly 424 and is in fluid communication with the residual chamber 434, the first permeate reservoir 438, the second permeate reservoir 440 and the second fluid reservoir 418.

In practice, a fluid is fed into the feed chamber 430 via feed stream inlet 432 and passes into the at least one first membrane cartridge assembly 442. Select components of the fluid permeate through membrane elements disposed within the at least one first membrane cartridge assembly 442 and are collected in the first permeate reservoir 438 and/or the second permeate reservoir 440. Non-permeate or residual components of the fluid exit the at least one first membrane cartridge assembly 442 and are collected in the second fluid reservoir 418, also known as a recycle reservoir. The non-permeate or residual fluid passes from the second fluid reservoir 418 into the at least one second membrane assembly 444. Select components of the residual fluid permeate through membrane elements disposed within the at least one second membrane cartridge assembly 444 and are collected in the first permeate reservoir 438 and/or the second permeate reservoir 440. The remaining fluid containing non-permeate components exits the at least one second membrane cartridge assembly 444 into the residual chamber 434 where it is removed from the pressure vessel 412 via residual stream outlet 436. A separation system 410 operated in this manner is generally known or referred to as a double-pass system.

In accordance with certain embodiments, the divider plate 428 may be mounted within the first fluid chamber 414 using a hinge or similar moveable attachment such that the divider plate 428 may be moved to allow access to the interior of the pressure vessel 412 such a via a manway 446 formed in the first end 416 of the pressure vessel 412. In accordance with another embodiment, the divider plate 428 may be releasably mounted within the first fluid reservoir 414 whereby the divider plate 428 may be removed from the first fluid reservoir 414 to allow access to the first tube sheet assembly 422 and/or to convert the separation system 410 from a double-pass system to a single-pass system as described herein above.

The separation system 410, in accordance with certain embodiments, can further include a divider plate such as, for example, similar to divider plate 428, disposed within the second fluid reservoir 418 extending from the second end 420 of the pressure vessel to the second tube sheet assembly 424. In one such embodiment, the divider plate 428 within the first fluid reservoir 414 can define first and second feed chambers (e.g., chambers 430 and 434, respectively) and the divider plate within the second fluid reservoir 418 can define opposing first and second residual reservoirs. The at least one first membrane cartridge assembly 442 extends from the first tube sheet assembly 422 to the second tube sheet assembly 424 and is in fluid communication with the first feed chamber (e.g., chamber 430), the first permeate reservoir 438, the second permeate reservoir 440, and the opposing first residual chamber. The at least one second membrane cartridge assembly 444 extends from the first tube sheet assembly 422 to the second tube sheet assembly 424 and is in fluid communication with the second feed chamber (e.g., chamber 434), the first permeate reservoir 438, the second permeate reservoir 440, and the opposing second residual chamber. The first residual chamber is in fluid communication with a first fluid stream port 448 and the second residual is in fluid communication with a second fluid port (e.g., fluid stream port 446). A separation system 410 operated in this manner is generally allows for or provides a 50% turndown (i.e., a 50% reduction in the volume of gas treated within the system) when fluid is fed to one of the first and second feed chambers (e.g., chambers 430 and 434).

In accordance with certain other embodiments, the divider plate 428 can extend through the first tube sheet assembly 422 and define first and second permeate reservoirs therein. Additionally, or alternatively, a divider plate, similar to the divider plate 428, disposed within the second fluid reservoir 418 can extend through the second tube sheet assembly 424 and define first and second permeate reservoirs therein.

In accordance with certain additional embodiments, two or more divider plates, such as, for example, similar to the divider plate 428, can be disposed within the first fluid reservoirs 414 to define three or more fluid chambers in the first end 416 of the pressure vessel 412. Additionally or alternatively, two or more divider plates, such as, for example, similar to the divider plate 428, can be disposed within the second fluid reservoirs 418 to define three or more fluid chambers in the second end 420 of the pressure vessel 412.

Optionally, separation systems in accordance with selected embodiments, such as shown in FIG. 2 or 10, may further include at least one condensation port (not shown) in fluid communication with an associated cartridge chamber, such as the cartridge chamber 72 shown in FIG. 2 or the cartridge chamber 426 show in FIG. 10.

Figure 11:
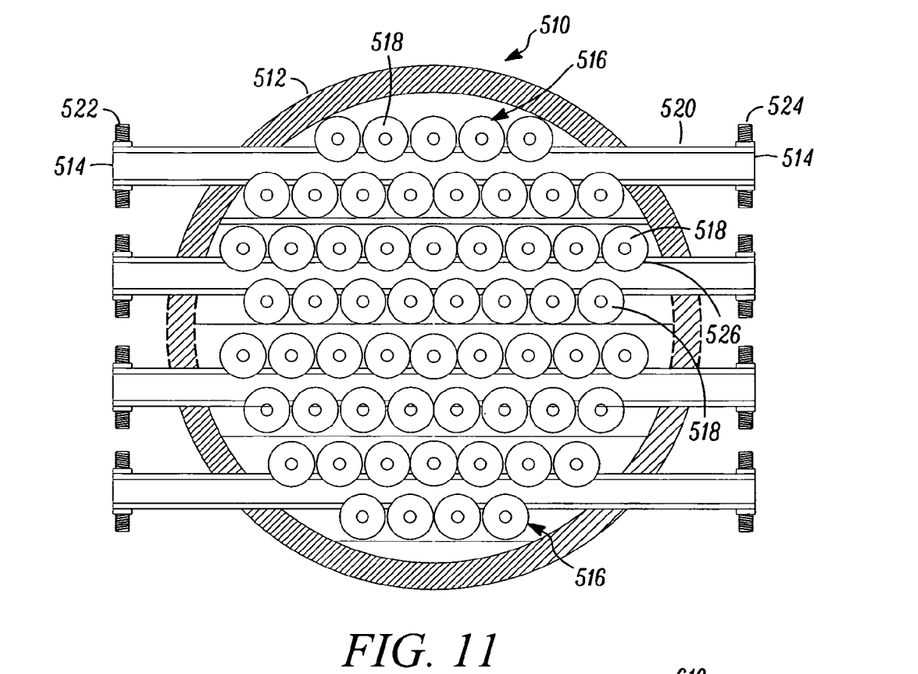
FIG. 11 is an end view of a separation system in accordance with a further embodiment.

In another embodiment, as shown in FIG. 11, a separation system 510 includes an elongated pressure vessel 512 including a feed stream inlet (not shown), a residual stream outlet (not shown) and plurality of permeate stream outlets 514. The separation system 510 further includes a plurality of membrane cartridge assemblies 516 extending from a first end to a second end of the pressure vessel 512. The membrane cartridge assemblies 516, constructed such as, for example, shown in FIG. 6, include at least a first permeate adapter 518, constructed such as described herein and shown in FIGS. 7-9, joined to a membrane cartridge (not shown).

The separation system 510 additionally includes a plurality of permeate headers 520 extending through the pressure vessel 512 perpendicular to the plurality of membrane cartridge assemblies 516. Each permeate header 520 is in fluid communication with a first permeate stream outlet 522, a second permeate stream outlet 524, and at least one membrane cartridge assembly 516. Each of the plurality of permeate headers 520 may include a plurality of adapter notches 526 for receiving one or more corresponding membrane cartridge assemblies 516. In practice, an membrane adapter notch 526 receives a permeate adapter 518 joined to a corresponding membrane cartridge assembly 516.

In accordance with certain embodiments, the separation system 510 can further include a permeate reservoir (not shown) having at least one permeate stream outlet for collecting permeate from the plurality of permeate headers 520. Such permeate reservoir can be in the form of a ring which surrounds or encircles the separation system 510 such that the first and second permeate outlets, 522 and 524, respectively, of each permeate header 520 are in fluid communication with the permeate reservoir. In practice, individual permeate streams from the plurality of permeate headers 520 are combined within the permeate reservoir and such combined permeate stream can be drawn from the separation system 510 using a reduced number of permeate stream outlets.

Figure 12:
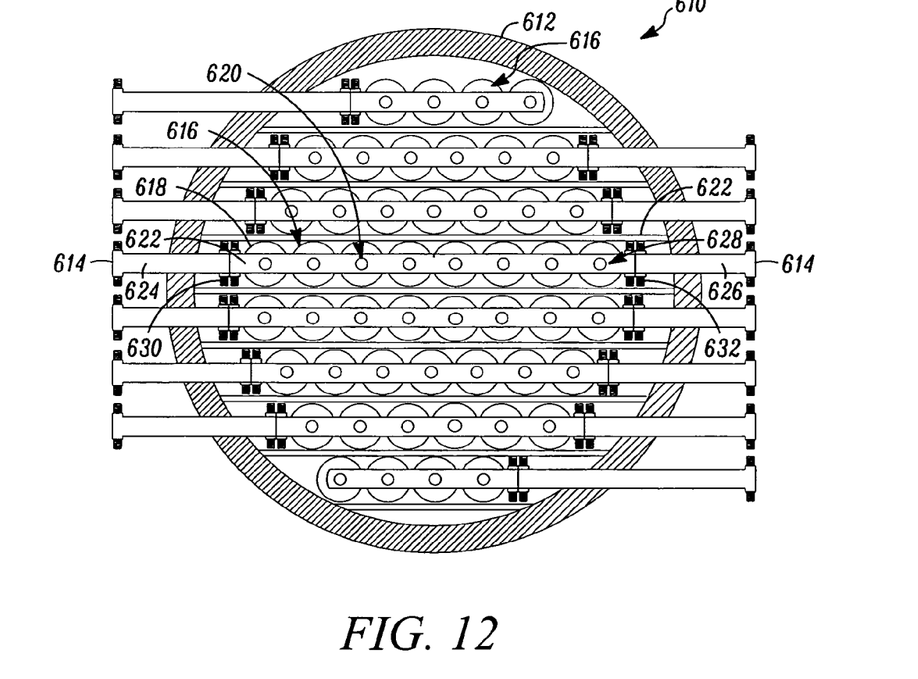
FIG. 12 is an end view of a separation system in accordance with yet another embodiment.

In a further embodiment, as shown in FIG. 12, a separation system 610 includes an elongated pressure vessel 612 including a feed stream inlet (not shown), a residual stream outlet (not shown) and plurality of permeate stream outlets 614. The separation system further includes a plurality of membrane cartridge assemblies 616 extending from a first end to a second end of the pressure vessel 612. The membrane cartridge assemblies 616 include at least a first permeate adapter 618 attached to a membrane cartridge (not shown).

The separation system 610 includes a plurality of permeate headers 620 extending through the pressure vessel 612 perpendicular to the plurality of membrane cartridge assemblies 616. Each permeate header 620 includes an internal header portion 622 disposed within the pressure vessel 612. The internal header portion 622 of each permeate header 620 is releasably attached to a first permeate stream outlet 624 and/or a second permeate stream outlet 626. A first end 628 of at least one membrane cartridge assembly 616 is releasably attached to an internal header portion 622 of an associated permeate header 620.

Each permeate header 620 further includes a first pair of raised face flanges 630 and/or a second pair of raised face flanges 632. The first pair of raised face flanges 630 releasably attach the internal header portion 622 of one of the permeate headers 620 to an associated first permeate stream outlet 624 and the second pair of raised face flanges 632 releasably attach the internal header portion 622 to a corresponding second permeate stream outlet 626.

In accordance with certain embodiments, the separation system 610 can further include a permeate reservoir similar to the permeate reservoir described above in conjunction with separation system 510.

As described above, the invention provides a separation system which incorporates a plurality of membrane cartridge assemblies within a pressure vessel that allows permeate to be transmitted from the plurality of membrane cartridges into one or more common permeate reservoirs within the pressure vessel where the permeate may be removed from the separation system via at least one permeate stream exit port. Thus, the invention permits feed stream delivery, residual stream removal from, and permeate stream removal form a multitude of membrane cartridges at a reduced number of locations.

As detailed herein, improvements and benefits realizable through the practice include, a separation system that produces or results in improved packaging at the skid level, reduced cost and installation weight due to the elimination of piping or flow connections to individual membrane cartridges or modules, and increased flexibility regarding flow configurations without requiring significant hardware substitutions.

The invention illustratively disclosed herein suitably may be practiced in the absence of any element, step, part, component, or ingredient which is not specifically disclosed herein.

While in the foregoing detailed description of this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A separation system comprising:
an elongated pressure vessel having a feed stream inlet, a residual stream outlet and at least one permeate stream outlet;
a first tube sheet assembly disposed within the pressure vessel and defining a first permeate reservoir therebetween, the first tube sheet assembly including a first pair of tube sheets and a plurality of first sleeves disposed therebetween, the first permeate reservoir in fluid communication with the at least one permeate stream outlet;
a first fluid reservoir disposed within the pressure vessel between a first end of the pressure vessel and the first tube sheet assembly; and
a plurality of membrane cartridge assemblies disposed within the pressure vessel and extending between the first end and a second end of the pressure vessel, at least one membrane cartridge assembly including a first permeate adapter and a membrane cartridge, the first permeate adapter joined to a first end of the membrane cartridge and disposed within one of the first sleeves, the first permeate adapter in fluid communication with the first fluid reservoir and the first permeate reservoir and wherein the at least one membrane cartridge assembly further includes a permeate passage tube extending from the first end of the membrane cartridge to a second end of the membrane cartridge and wherein the first permeate adapter comprises a first front portion, a first back portion and a first body portion extending between the first front portion and the first back portion, the first body portion defining a central blind bore for receiving a first end of the permeate passage tube and a plurality of permeate discharge ports extending radially from the central blind bore to an outer surface of the first body portion, the plurality of permeate discharge ports in fluid communication with the first permeate reservoir.

2. The separation system of claim 1 wherein the first permeate adapter further includes a plurality of fluid ports extending parallel to the central blind bore, each fluid port disposed between adjacent permeate discharge ports and in fluid communication with the first fluid reservoir and the first end of the membrane cartridge.

3. A separation system comprising:
a pressure vessel including a feed stream inlet, a residual stream outlet and at least two permeate stream outlets, the pressure vessel further including a feed reservoir in fluid communication with the feed stream inlet, a first permeate reservoir defined by a first tube sheet assembly and in fluid communication with at least one first permeate stream outlet, a cartridge chamber, a second permeate reservoir defined by a second tube sheet assembly and in fluid communication with at least one second permeate stream outlet, and a residual reservoir in fluid communication with the residual stream outlet, the first tube sheet assembly including a first tube sheet, a second tube sheet and a plurality of first sleeves disposed therebetween, the second tube sheet assembly including a third tube sheet, a fourth tube sheet and a plurality of second sleeves disposed therebetween, the plurality of second sleeves corresponding to the plurality of first sleeves;
a plurality of membrane cartridge assemblies disposed within the pressure vessel and extending from the feed reservoir to the residual reservoir, each membrane cartridge assembly including, a first permeate adapter including a plurality of first permeate discharge ports in fluid communication with the first permeate reservoir, a second permeate adapter including a plurality of second permeate discharge ports in fluid communication with the second permeate reservoir, and a membrane cartridge including a permeate passage tube extending from a first end to a second end of the membrane cartridge, the first permeate adapter disposed within one of the first sleeves and in fluid communication with the feed reservoir, the first permeate adapter joined to the first end of the membrane cartridge and further joined to a first end of the permeate passage tube, the second permeate adapter disposed within the corresponding second sleeve and in fluid communication with the residual reservoir, the second permeate joined to the second end of the membrane cartridge and further joined to a second end of the permeate passage tube.

4. The separation system of claim 3 wherein the plurality of first sleeves are permanently joined to the first and second tube sheets and the plurality of second sleeves are permanently joined to the third and fourth tube sheets.

5. The separation system of claim 3 wherein each first sleeve includes a plurality of first permeate exit openings at least partially aligned with the plurality of first permeate discharge ports of the first permeate adapter disposed therein.

6. The separation system of claim 3 wherein each second sleeve includes a plurality of second permeate exit openings at least partially aligned with the plurality of second permeate discharge ports of the second permeate adapter disposed therein.

* * * * *